US012682746B2

(12) United States Patent
Oka

(10) Patent No.: US 12,682,746 B2
(45) Date of Patent: Jul. 14, 2026

(54) MONITORING SYSTEM, MONITORING METHOD, AND COMPUTER READABLE MEDIUM

(71) Applicant: NEC Corporation, Tokyo (JP)

(72) Inventor: Yukiko Oka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 12 days.

(21) Appl. No.: 18/845,021

(22) PCT Filed: Mar. 23, 2022

(86) PCT No.: PCT/JP2022/013485
§ 371 (c)(1),
(2) Date: Sep. 9, 2024

(87) PCT Pub. No.: WO2023/181168
PCT Pub. Date: Sep. 28, 2023

(65) Prior Publication Data
US 2025/0182614 A1 Jun. 5, 2025

(51) Int. Cl.
*G08G 1/01* (2006.01)
*G06V 20/54* (2022.01)

(52) U.S. Cl.
CPC ........... *G08G 1/0133* (2013.01); *G06V 20/54* (2022.01); *G08G 1/0112* (2013.01)

(58) Field of Classification Search
CPC ........ G06V 20/54; G08G 1/0112; G08G 1/00; G08G 1/0133
USPC .......................................................... 701/117
See application file for complete search history.

(56) References Cited

U.S. PATENT DOCUMENTS

| | | | | |
|---|---|---|---|---|
| 2013/0088351 A1* | 4/2013 | Kim | ...................... | G08B 25/08 |
| | | | | 340/539.22 |
| 2020/0055597 A1* | 2/2020 | Fujimoto | ................. | B64D 1/08 |
| 2023/0133873 A1* | 5/2023 | Iwai | ...................... | G06V 20/20 |
| | | | | 348/148 |

FOREIGN PATENT DOCUMENTS

| | | | |
|---|---|---|---|
| JP | 2000-285351 A | | 10/2000 |
| JP | 2013-200866 A | | 10/2013 |
| JP | 2018-055362 A | | 4/2018 |
| JP | 2018055362 | * | 4/2018 |
| WO | 2018/083798 A1 | | 5/2018 |

OTHER PUBLICATIONS

International Search Report for PCT Application No. PCT/JP2022/013485, mailed on Jun. 14, 2022.

* cited by examiner

*Primary Examiner* — Hitesh Patel
*Assistant Examiner* — John D Holman
(74) *Attorney, Agent, or Firm* — Sughrue Mion, PLLC

(57) ABSTRACT

Provided are a monitoring system, a monitoring method, and a computer readable medium that optimize a monitoring position by a moving body. A monitoring system (1) monitors a monitoring region set on a road using a moving body (11) and includes a report acquisition unit (12) configured to acquire a report on a dangerous event in the monitoring region or in a vicinity of the monitoring region and a monitoring region control unit (13) configured to determine whether to change the monitoring region on the basis of the report acquired by the report acquisition unit (12).

12 Claims, 9 Drawing Sheets

MONITORING SYSTEM, MONITORING METHOD, AND COMPUTER READABLE MEDIUM

This application is a National Stage Entry of PCT/JP2022/013485 filed on Mar. 23, 2022, the contents of all of which are incorporated herein by reference, in their entirety.

TECHNICAL FIELD

The present disclosure relates to a monitoring system, a monitoring method, and a computer readable medium.

BACKGROUND ART

A method for avoiding traffic accidents that occur on roads often depend on the reactions of passers such as vehicles and pedestrians. In particular, the reactions of the passers are delayed at points, such as blind spots, on the road, which results in a high possibility of accidents. Therefore, there is a technique that installs a camera in a street lamp, a traffic light, or the like and records information of an approaching passer in order to record an accident or a situation that can lead to an accident.

In addition, Patent Literature 1 discloses the following technique. For the purpose of security and exploration, a moving body, such as a drone apparatus, is set to patrol a certain route, a video is captured by a camera mounted on the moving body, and an abnormality is detected on the basis of the captured video.

CITATION LIST

Patent Literature

Patent Literature 1: International Patent Publication No. WO2018/083798

SUMMARY OF INVENTION

Technical Problem

However, in the technique disclosed in Patent Literature 1, for example, even when the moving body that monitors the road is disposed, there is a possibility that an accident or a situation that can lead to an accident will occur in a blind spot of a monitoring region by the moving body. That is, even when the moving body that monitors the road is disposed, there is a concern that an accident or a situation that can lead to an accident will not be detected depending on the setting of the monitoring region.

Therefore, an object of the present disclosure is to provide a monitoring system, a monitoring method, and a computer readable medium that optimize a monitoring region by a moving body.

Solution to Problem

According to an example embodiment, there is provided a monitoring system for monitoring a monitoring region set on a road using a moving body. The monitoring system includes: a report acquisition unit configured to acquire a report on a dangerous event in the monitoring region or in a vicinity of the monitoring region; and a monitoring region control unit configured to determine whether to change the monitoring region on the basis of the report acquired by the report acquisition unit.

According to another example embodiment, there is provided a monitoring method for monitoring a monitoring region set on a road using a moving body. The monitoring method includes: a step of acquiring a report on a dangerous event in the monitoring region or in a vicinity of the monitoring region; and a step of determining whether to change the monitoring region on the basis of the acquired report.

According to still another example embodiment, there is provided a non-transitory computer readable medium storing a monitoring program for monitoring a monitoring region set on a road using a moving body. The monitoring program causes a computer to execute: a step of acquiring a report on a dangerous event in the monitoring region or in a vicinity of the monitoring region; and a step of determining whether to change the monitoring region on the basis of the acquired report.

Advantageous Effects of Invention

According to the present disclosure, it is possible to provide a monitoring system, a monitoring method, and a computer readable medium that optimize a monitoring region by a moving body.

EXAMPLE EMBODIMENT

First Example Embodiment

Figure 1:
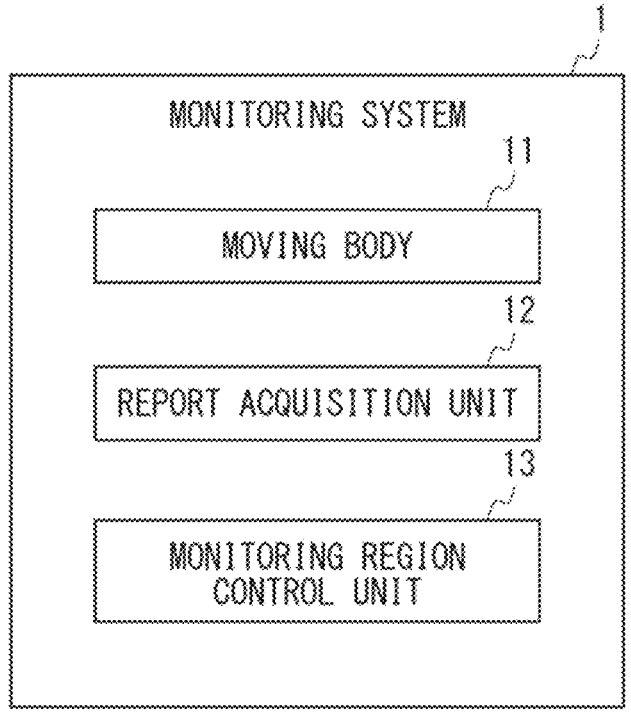
FIG. 1 is a block diagram illustrating a configuration of a monitoring system according to a first example embodiment.

Hereinafter, a monitoring system 1 according to a first example embodiment will be described with reference to the drawings. FIG. 1 is a block diagram illustrating a configuration of the monitoring system 1. The monitoring system 1 is a system that monitors a monitoring region set on a road and detects a dangerous event occurring in the monitoring region. Here, the dangerous event is an event indicating an accident or a situation that can lead to an accident. As illustrated in FIG. 1, the monitoring system 1 includes a moving body 11, a report acquisition unit 12, and a monitoring region control unit 13.

The moving body 11 monitors the monitoring region set on the road.

The report acquisition unit 12 acquires a report on the dangerous event in the monitoring region or in the vicinity of the monitoring region.

The monitoring region control unit 13 determines whether to change the monitoring region on the basis of the report acquired by the report acquisition unit 12.

Here, the monitoring system 1 executes a process according to a monitoring method including the following steps. First, the report acquisition unit 12 acquires the report on the dangerous event in the monitoring region or in the vicinity of the monitoring region. Then, the monitoring region control unit 13 determines whether to change the monitoring region on the basis of the report acquired by the report acquisition unit 12.

According to the monitoring system 1 of the first example embodiment, it is possible to provide a monitoring system that optimizes the monitoring region by the moving body.

Second Example Embodiment

Figure 2:
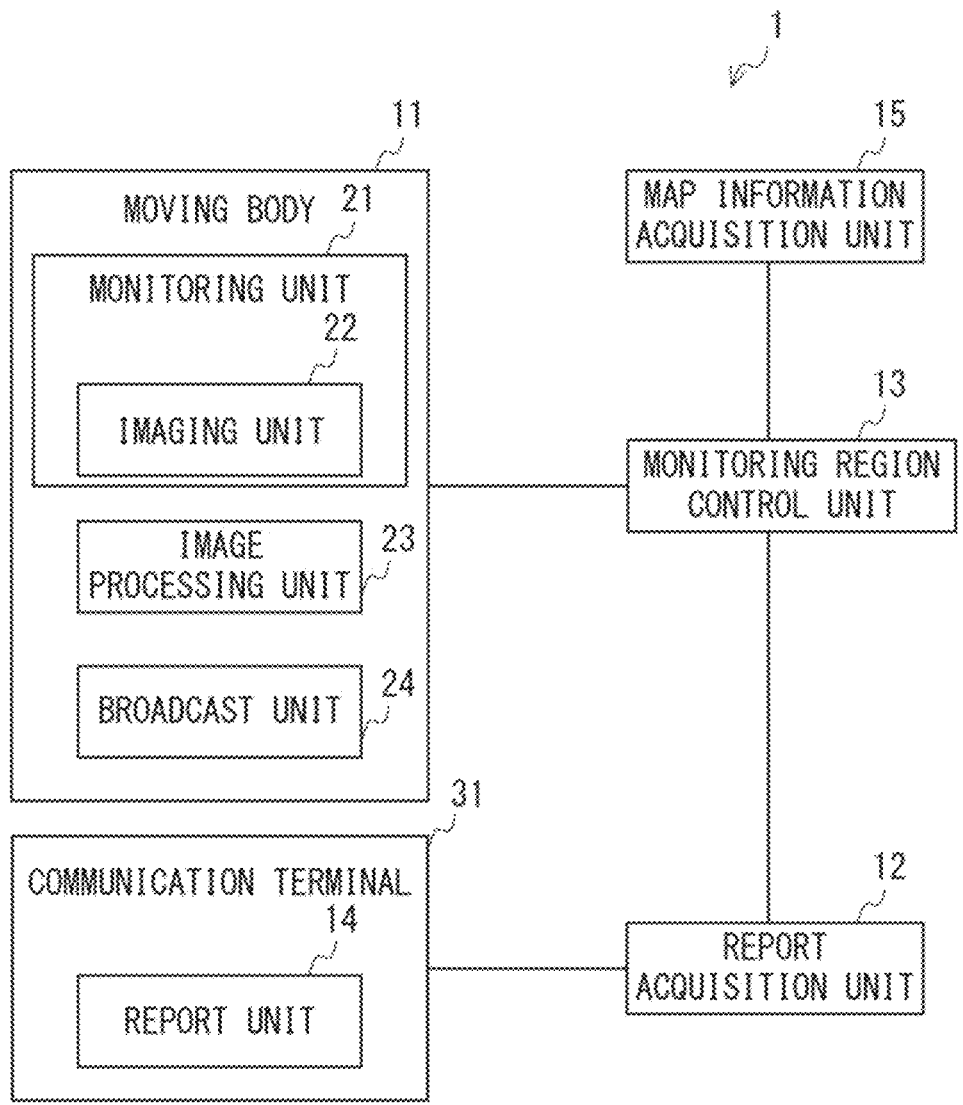
FIG. 2 is a block diagram illustrating a configuration of a monitoring system according to a second example embodiment.

Hereinafter, a monitoring system 1 according to a second example embodiment will be described with reference to the drawings. FIG. 2 is a block diagram illustrating a configuration of the monitoring system 1. The monitoring system 1 is a system that monitors a monitoring region set on a road and detects a dangerous event occurring in the monitoring region. In addition, the monitoring system 1 is configured to be able to broadcast the dangerous event to a vehicle or a person that passes through the monitoring region or the vicinity of the monitoring region when detecting the dangerous event. As illustrated in FIG. 2, the monitoring system 1 includes a moving body 11, a report acquisition unit 12, a monitoring region control unit 13, a report unit 14, and a map information acquisition unit 15.

The moving body 11 monitors the monitoring region set on the road. Here, the monitoring region set on the road is a region in which a dangerous event is likely to occur mainly on the road and is, for example, an intersection. In addition, the moving body 11 detects the dangerous event occurring in the monitoring region. The moving body 11 is a machine that autonomously moves on the road. The moving body 11 is disposed, for example, at a predetermined point on the road in order to monitor the set monitoring region. The movement of the moving body 11 is controlled by communication with the monitoring region control unit 13, and the moving body 11 is moved to the predetermined point on the road. The moving body 11 is, for example, a drone that moves in the air. The moving body 11 is operated by a built-in battery. The moving body 11 includes, for example, a monitoring unit 21, an imaging unit 22, an image processing unit 23, and a broadcast unit 24.

The monitoring unit 21 is mounted on the moving body 11 and is configured to be able to monitor the predetermined monitoring region. In addition, the monitoring unit 21 detects the dangerous event occurring in the monitoring region. For example, the monitoring unit 21 detects that passers passing through the monitoring region excessively approach each other as the dangerous event. Here, the passer indicates a vehicle or a person that passes through the road. In addition, the approach between the passers detected as the dangerous event by the monitoring unit 21 is mainly an approach between a vehicle and a person or an approach between vehicles. In the present example embodiment, the monitoring unit 21 is configured by the imaging unit 22. The imaging unit 22 images a predetermined monitoring region and detects the dangerous event occurring within an imaging range. The imaging unit 22 captures an overhead view of the monitoring region on the road. The imaging unit 22 particularly images the passer that passes through the monitoring region and detects the dangerous event from the situation.

Figure 4:
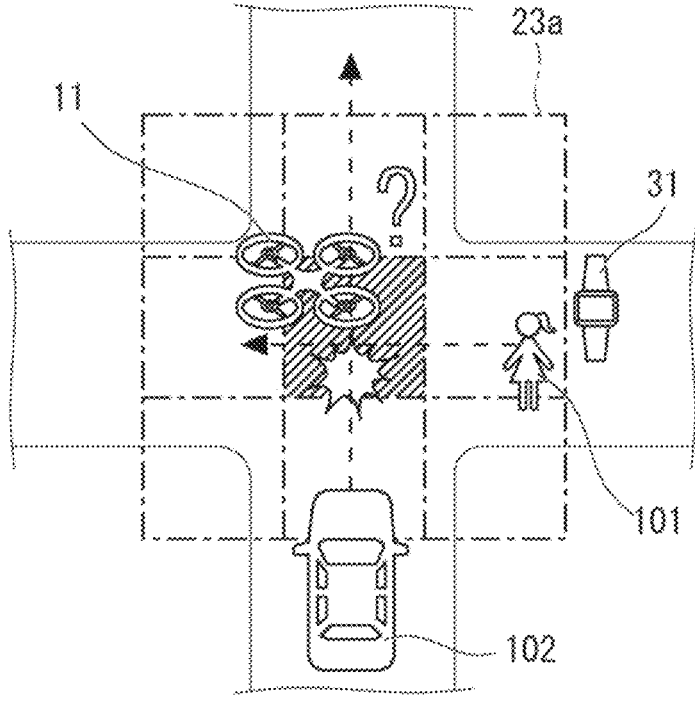
FIG. 4 is a diagram schematically illustrating an example of the process by the monitoring system according to the second example embodiment.
Figure 5:
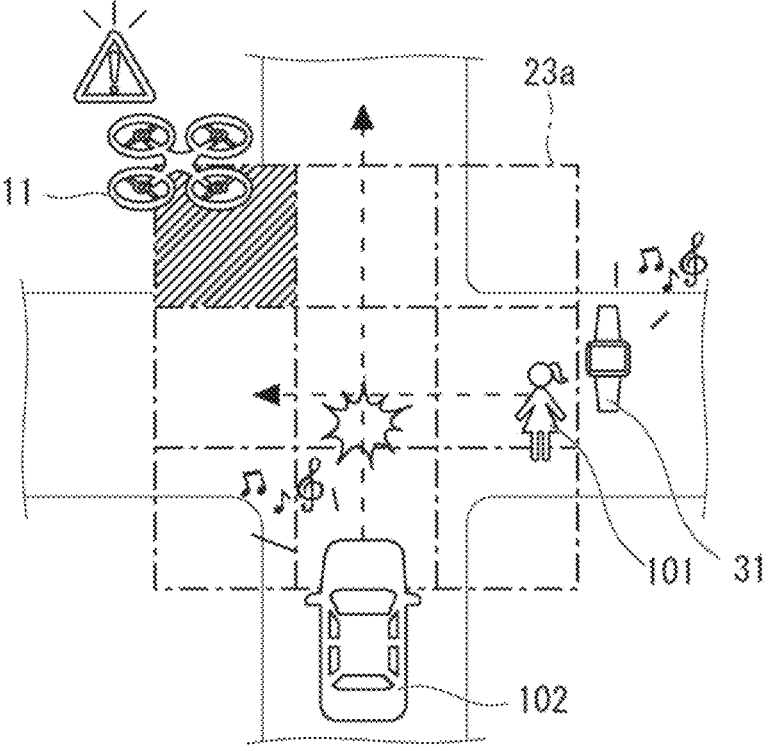
FIG. 5 is a diagram schematically illustrating an example of the process by the monitoring system according to the second example embodiment.

The image processing unit 23 performs a process of dividing the range imaged by the imaging unit 22 into a plurality of virtual areas. For example, as illustrated in FIGS. 4 and 5, the image processing unit 23 creates a monitoring area 23a that is set to include the monitoring region by the moving body 11 and a peripheral region of the monitoring region. For example, when the moving body 11 is disposed at the predetermined point on the road, the image processing unit 23 processes the image of the monitoring region and the peripheral region of the monitoring region captured by the imaging unit 22 from the sky. As illustrated in FIG. 4 and the like, for example, the image processing unit 23 divides the image of an intersection by captured from the sky into nine equal areas.

When the dangerous event is detected by the monitoring unit 21, the broadcast unit 24 immediately broadcasts the dangerous event to the passer that passes through the monitoring region or the vicinity of the monitoring region. The broadcast unit 24 is configured to be able to communicate with, for example, a communication terminal 31 possessed by the passer. Here, the communication terminal 31 possessed by the passer is, for example, a smartphone, a multifunctional clock, or an in-vehicle terminal mounted on a vehicle. When the dangerous event is detected by the moving body 11, the broadcast unit 24 immediately transmits information of the dangerous event to the communication terminal 31. When receiving the information of the dangerous event, the communication terminal 31 issues an alert to broadcast the dangerous event to the passer.

The report acquisition unit 12 acquires a report on the dangerous event in the monitoring region by the moving body 11 or the vicinity of the monitoring region. For example, the report acquisition unit 12 acquires the report on the dangerous event from the passer that has passed through the monitoring region by the moving body 11 or the vicinity of the monitoring region. The report acquisition unit 12 is configured to be able to transmit and receive information to and from the report unit 14. When the dangerous event is detected in the monitoring region by the moving body 11 or when the passer encounters the dangerous event in the vicinity of the monitoring region, the report acquisition unit 12 prompts the passer to report the dangerous event. For example, when the passers excessively approach each other, the report acquisition unit 12 acquires information indicating that the passers approach each other from the communication terminal 31 possessed by the passer. The report acquisition unit 12 requests the communication terminal 31 to create the report on the dangerous event. The content of the report is, for example, the time or position where the dangerous event has occurred, a specific situation, or the like. The report acquisition unit 12 outputs the acquired report on the dangerous event to the map information acquisition unit 15.

The monitoring region control unit 13 acquires information of the monitoring region set on the road and causes the moving body 11 to monitor the monitoring region. Here, for example, there are a plurality of regions in which the dangerous event is likely to occur on the road. Therefore, a plurality of monitoring regions are set on the road in order to monitor the plurality of regions. The monitoring region control unit 13 selects one monitoring region among the plurality of monitoring regions set on the road and causes the moving body 11 to monitor the monitoring region. For example, the monitoring region control unit 13 determines the monitoring region by the moving body 11 on the basis of the information set in the map information acquisition unit 15. The monitoring region control unit 13 communicates with the moving body 11 and moves the moving body 11 to a position where the selected monitoring region can be monitored.

In addition, the monitoring region control unit 13 changes the monitoring region by the moving body 11 in a region in the vicinity of the selected one monitoring region as necessary. Specifically, the monitoring region control unit 13 determines whether to change the monitoring region on the basis of the report acquired by the report acquisition unit 12. For example, the monitoring region control unit 13 changes the monitoring region by the moving body 11 so as to include a position where the dangerous event specified by the acquired report can be detected. In addition, as another example, the monitoring region control unit 13 determines whether to change the monitoring region on the basis of comparison between the dangerous event detected by the moving body 11 and the dangerous event specified by the report acquired by the report acquisition unit 12. For example, in a case where the dangerous event specified by the acquired report is detected by the moving body 11, the monitoring region control unit 13 determines not to change the monitoring region. Here, the change of the monitoring region is implemented, for example, by changing the position of the moving body 11. Further, the change of the position of the moving body 11 includes movement in the horizontal direction and movement in the vertical direction. In other words, the change of the position of the moving body 11 includes movement in a direction along the road surface and movement in a direction of changing height. Alternatively, the monitoring region control unit 13 may compare the dangerous event specified by the acquired report with the dangerous event detected by the moving body 11, determine which dangerous event should be preferentially detected, and determine whether to change the monitoring region on the basis of a result of the determination. That is, the monitoring region control unit 13 has two functions of a first function and a second function as functions of determining a target position of the moving body 11.

The first function is a function of determining the disposition of the moving body 11 to monitor any one of the plurality of monitoring regions set on the road. The monitoring region control unit 13 determines the disposition of the moving body 11 on the road on the basis of the information acquired by the map information acquisition unit 15. For example, the monitoring region control unit 13 sets the plurality of monitoring regions on the road as candidates and determines at which position the moving body 11 is to be disposed on the basis of information on a time when the detection of the dangerous event is desired. In addition, the monitoring region control unit 13 causes the moving body 11 to patrol the plurality of monitoring regions as candidates on the road on the basis of a monitoring plan created by the map information acquisition unit 15.

The second function is a function of further determining the position of the moving body 11 in detail in a region in the vicinity of the position where the moving body 11 has been selectively disposed by the first function. The monitoring region control unit 13 disposes the moving body 11 at a predetermined position on the road on the basis of the information acquired by the map information acquisition unit 15. Therefore, the monitoring region control unit 13 resets the target position of the moving body 11 as necessary on the basis of the detection result of the dangerous event by the moving body 11 or the report acquired by the report acquisition unit 12. The target position of the moving body 11 is determined to be, for example, a position where the dangerous event specified by the report acquisition unit 12 can be detected. The monitoring region control unit 13 moves the moving body 11 to the determined position. As a specific example, the monitoring region control unit 13 determines, as the target position of the moving body 11, an area in which the dangerous event specified by the report acquisition unit 12 can be detected among a plurality of virtual areas created by the image processing unit 23. The monitoring region control unit 13 moves the moving body 11 to the area determined as the target position. Alternatively, the monitoring region control unit 13 determines a height at which the dangerous event specified by the report acquisition unit 12 can be detected as the target position and moves the moving body 11 to the determined height.

The report unit 14 reports the dangerous event to the report acquisition unit 12. The report unit 14 is, for example, a means for enabling the passer to input a report on the dangerous event. The report unit 14 is provided, for example, in the communication terminal 31 possessed by the passer. As a specific example, the report unit 14 is provided in a smartphone, a multifunctional watch, or an in-vehicle terminal mounted on a vehicle. The report unit 14 causes the passer to input a predetermined report item related to the dangerous event in response to a request received from the report acquisition unit 12. The report unit 14 transmits the input information to the report acquisition unit 12.

The map information acquisition unit 15 acquires information of the region in which the dangerous event is likely to occur on the road and the time when the dangerous event is likely to occur. This information is set on the basis of a traffic condition and an accident occurrence situation of each region on the road. The information of the region in which the dangerous event is likely to occur on the road and the time when the dangerous event is likely to occur is stored in the map information acquisition unit 15. In addition, the map information acquisition unit 15 updates the information of the region in which the dangerous event is likely to occur and the time when the dangerous event is likely to occur on the basis of the detection result of the dangerous event by the moving body 11 and the report acquired by the report acquisition unit 12.

Further, the map information acquisition unit 15 creates a monitoring plan for managing the region to be monitored by the moving body 11 and the monitoring time, on the basis of the information stored in advance, the detection result of the dangerous event by the moving body 11, and the report acquired by the report acquisition unit 12. As a specific example, when the dangerous event is detected by the moving body 11 or the report on the dangerous event is acquired by the report acquisition unit 12, the map information acquisition unit 15 sets the condition that the moving body 11 should execute monitoring in the region and at the time, with reference to information of the region in which and the dangerous event has occurred and the time when the dangerous event occurred. Then, the map information acquisition unit 15 creates the monitoring plan by the moving body 11 on the basis of the set condition.

Further, the map information acquisition unit 15 acquires the remaining battery level of the moving body 11. The map information acquisition unit 15 manages the operating time of the moving body 11 on the basis of the remaining battery level of the moving body 11. The map information acquisition unit 15 creates the monitoring plan by the moving body 11 in consideration of the remaining battery level of the moving body 11.

In addition, the map information acquisition unit 15 updates the information of the monitoring region in which the dangerous event is more easily detected in the region in the vicinity of the selected one monitoring region. For example, the map information acquisition unit 15 assumes that a region including the position where the dangerous event specified by the report acquired by the report acquisition unit 12 can be detected is the monitoring region in which the dangerous event is easily detected. Further, for example, in a case where the dangerous event specified by the report acquired by the report acquisition unit 12 is detected by the moving body 11, the map information acquisition unit 15 assumes that the current monitoring region is the monitoring region in which the dangerous event is easily detected.

Figure 3:
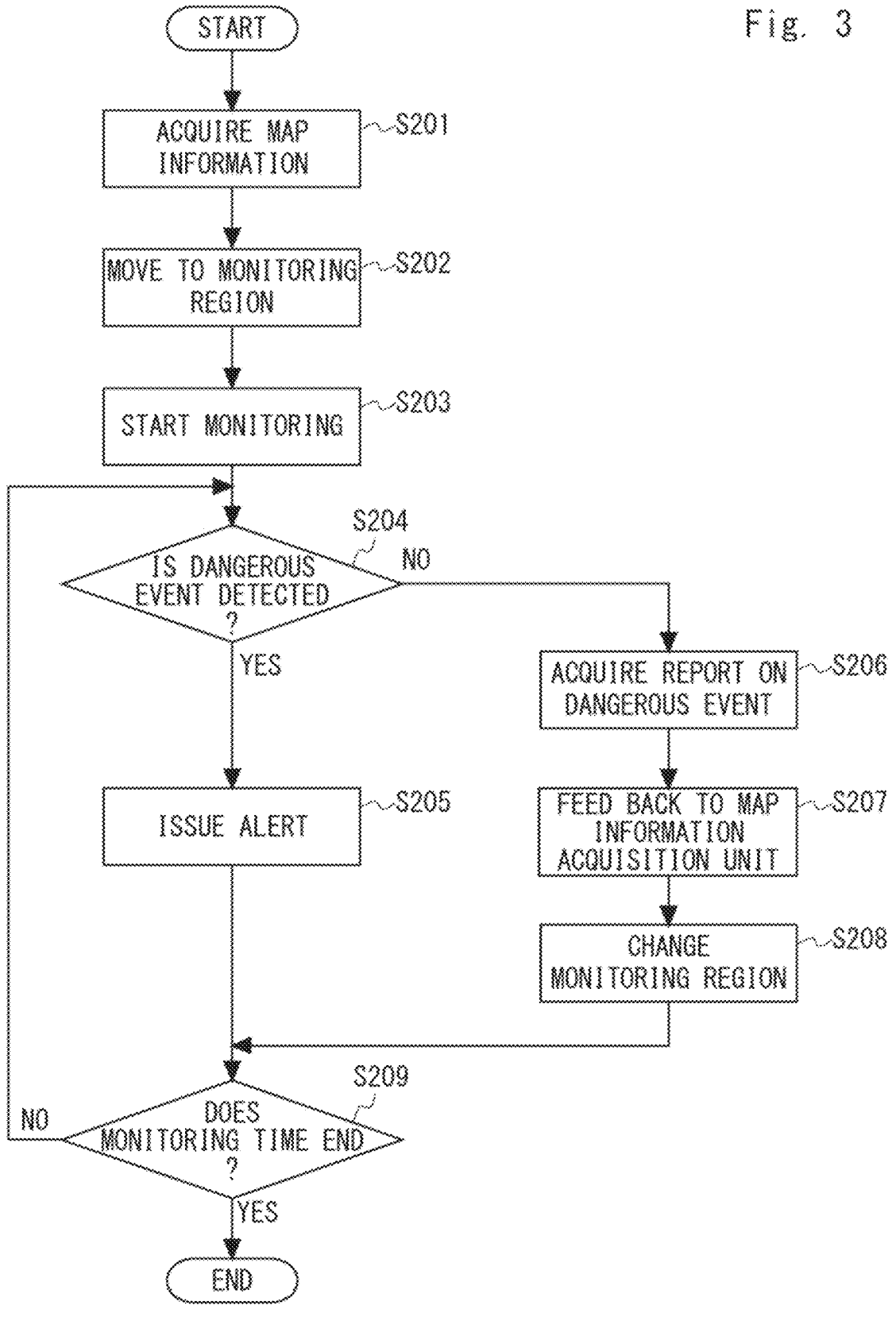
FIG. 3 is a flowchart illustrating an example of a process by the monitoring system according to the second example embodiment.

A specific example of the process by the monitoring system 1 will be described with reference to FIGS. 3 to 5. FIG. 3 is a flowchart illustrating an example of the process by the monitoring system 1. FIG. 4 is a plan view illustrating an intersection as one monitoring region on the road and is a diagram schematically illustrating an example of processing by the monitoring system 1. FIG. 5 is a plan view illustrating an intersection as one monitoring region on the road and is a diagram schematically illustrating an example of the process by the monitoring system 1. Further, FIGS. 4 and 5 illustrate an aspect in which a pedestrian 101 and a vehicle 102 approach each other at the intersection as an example of the situation that can lead to an accident. In addition, FIG. 4 illustrates an aspect in which the moving body 11 does not detect that the pedestrian 101 and the vehicle 102 approach each other. FIG. 5 illustrates an aspect in which the moving body 11 detects that the pedestrian 101 and the vehicle 102 approach each other.

First, in step S201, the monitoring region control unit 13 acquires information of the region monitored by the moving body 11 and the monitoring time with reference to the information of the map information acquisition unit 15. Then, in step S202, the monitoring region control unit 13 determines a target position of the moving body 11 on the basis of the acquired information and moves the moving body 11 to the determined position. Then, in step S203, the moving body 11 starts monitoring the monitoring region. Then, in step S204, in a case where the dangerous event is detected by the moving body 11 (Yes in step S204), the process proceeds to step S205. On the other hand, in a case where the dangerous event is not detected by the moving body 11 (No in step S204), the process proceeds to step S206.

In step S205, the broadcast unit 24 broadcasts that the dangerous event has been detected to the passer. Specifically, as illustrated in FIG. 5, the broadcast unit 24 communicates with the communication terminal 31 possessed by the pedestrian 101 and the in-vehicle terminal of the vehicle 102 and causes the communication terminal 31 and the in-vehicle terminal to issue an alert. In addition, a communication terminal possessed by a person in the vehicle may be used instead of the in-vehicle terminal. The same applies to the in-vehicle terminal described below. As a result, the pedestrian 101 and the vehicle 102 are notified that they may have an accident or are in a situation that can lead to an accident. Then, the process proceeds to step S209.

In step S206, the report unit 14 is prompted to report the dangerous event, and the report acquisition unit 12 acquires the report on the dangerous event. Specifically, the report acquisition unit 12 communicates with the communication terminal 31 possessed by the pedestrian 101 and the in-vehicle terminal of the vehicle 102 to acquire the report on the details of the dangerous event such as the occurrence time, the position, and the situation. Then, in step S207, the report acquisition unit 12 feeds back the acquired information of the details of the dangerous event to the map information acquisition unit 15. The map information acquisition unit 15 updates the information of the monitoring region by the moving body 11 and the monitoring time on the basis of the fed-back information. Then, in step S208, the monitoring region control unit 13 changes the monitoring position by the moving body 11 on the basis of the updated information of the map information acquisition unit 15.

A specific example of the flow of the process in steps S204 to S208 will be described with reference to FIGS. 4 and 5. As illustrated in FIG. 4, for example, the monitoring region control unit 13 selectively disposes the moving body 11 in a central area from a monitoring area 23a obtained by dividing the intersection into nine virtual areas. Here, it is assumed that a dangerous event in which the pedestrian 101 and the vehicle 102 excessively approach each other has occurred, but has not been detected by the moving body 11 as illustrated in FIG. 4. Then, the report acquisition unit 12 communicates with the communication terminal 31 possessed by the pedestrian 101 and the in-vehicle terminal of the vehicle 102, to acquire the report on the details of the dangerous event. The report acquisition unit 12 feeds back the acquired information of the details of the dangerous event to the map information acquisition unit 15. The map information acquisition unit 15 updates the information of the position where the moving body 11 is disposed on the basis of the fed-back information such that a similar dangerous event can be detected. Then, as illustrated in FIG. 5, the monitoring region control unit 13 changes the disposition of the moving body 11 to another area in which a similar dangerous event is more easily detected on the basis of the updated information of the map information acquisition unit 15. Here, in a case where the dangerous event has been detected at the changed position, the moving body 11 immediately broadcasts the dangerous event to the passer using the broadcast unit 24.

In addition, in a case where the dangerous event is not detected by the moving body 11 (No in step S204) and the report acquisition unit 12 does not acquire the report on the dangerous event, information indicating that no dangerous event has occurred may be fed back to the map information acquisition unit 15, which is not illustrated. For example, the map information acquisition unit 15 may perform a process of lowering a monitoring priority of the monitoring region and changing the monitoring time by the moving body 11.

Then, in step S209, it is determined whether to end the monitoring time by the moving body 11. In a case where the monitoring time is ended (Yes in step S209), the monitoring system 1 ends the process. In a case where the monitoring time is not ended (No in step S209), the process returns to step S204, and the detection of the dangerous event by the moving body 11 is continued.

Figure 6:
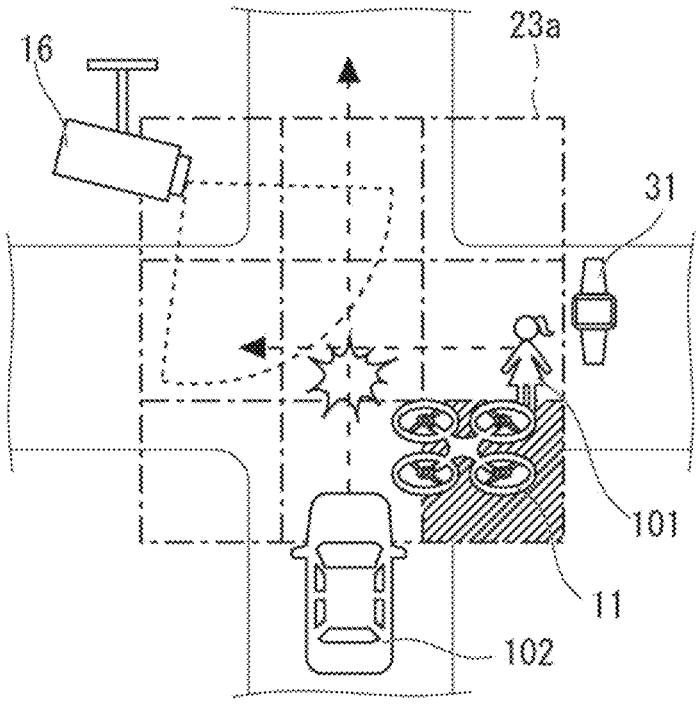
FIG. 6 is a diagram schematically illustrating an example of the process by the monitoring system according to the second example embodiment.

Here, a modified example of the monitoring system 1 will be described with reference to FIG. 6. FIG. 6 is a plan view illustrating an intersection as one monitoring region on the road and is a diagram schematically illustrating an example of the process by the monitoring system. As illustrated in FIG. 6, the monitoring system 1 may be configured to further include a monitoring apparatus 16. The monitoring apparatus 16 is fixedly installed on the road or in the vicinity of the road and detects a dangerous event in a monitorable region. In addition, the monitoring apparatus 16 may include, for example, a broadcast unit that immediately broadcasts the dangerous event when detecting the dangerous event. The monitoring apparatus 16 is, for example, a monitoring camera. For example, the monitoring apparatus 16 detects a dangerous event in an imaging range represented by a broken line in FIG. 6.

When a dangerous event is detected by the monitoring apparatus 16, the monitoring system 1 immediately broadcasts the dangerous event to the passer using, for example, the broadcast unit (not illustrated). Here, the monitoring region by the moving body 11 may be set on the basis of a monitoring range that can be monitored by the monitoring apparatus 16. Specifically, first, a region that can be monitored by the monitoring apparatus 16 is set in the map information acquisition unit 15. Then, the monitoring region by the moving body 11 is a region which is other than the region that can be monitored by the monitoring apparatus 16 and in which a dangerous event can be detected. In the monitoring system 1, the moving body 11 and the monitoring apparatus 16 can complement the range in which the dangerous event can be detected.

Figure 7:
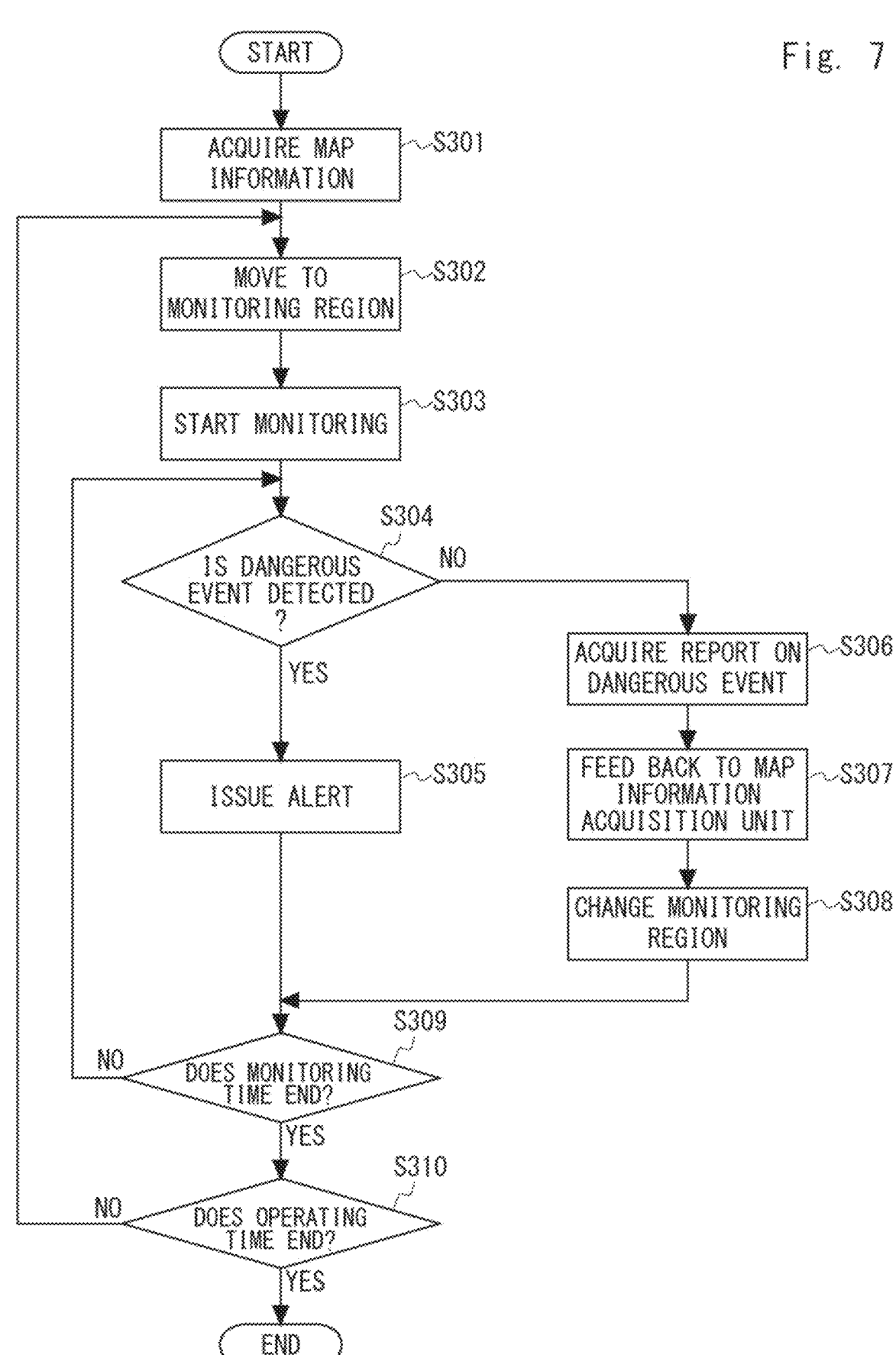
FIG. 7 is a flowchart illustrating an example of the process by the monitoring system according to the second example embodiment.
Figure 8:
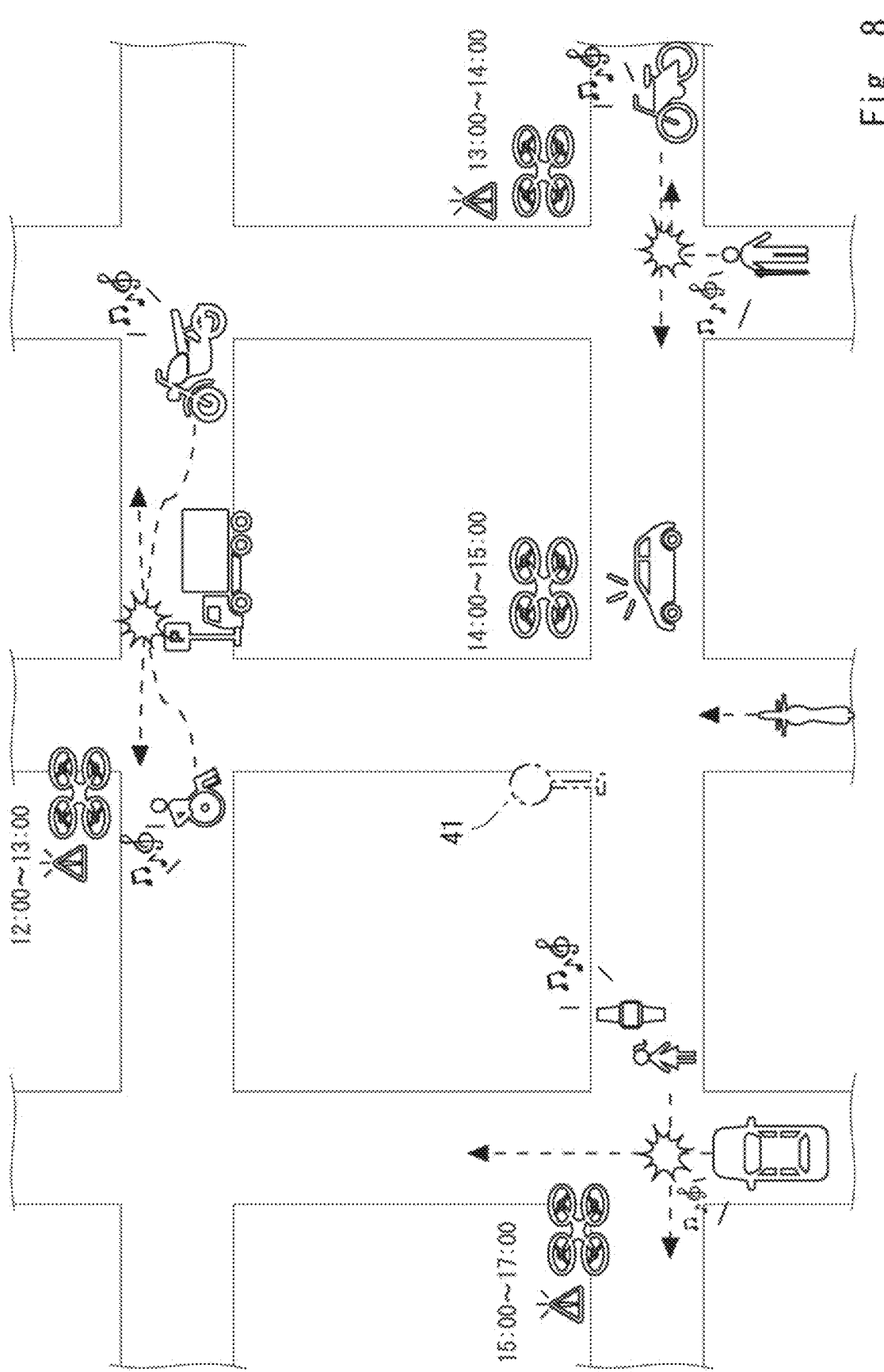
FIG. 8 is a diagram schematically illustrating an example of the process by the monitoring system according to the second example embodiment.
Figure 9:
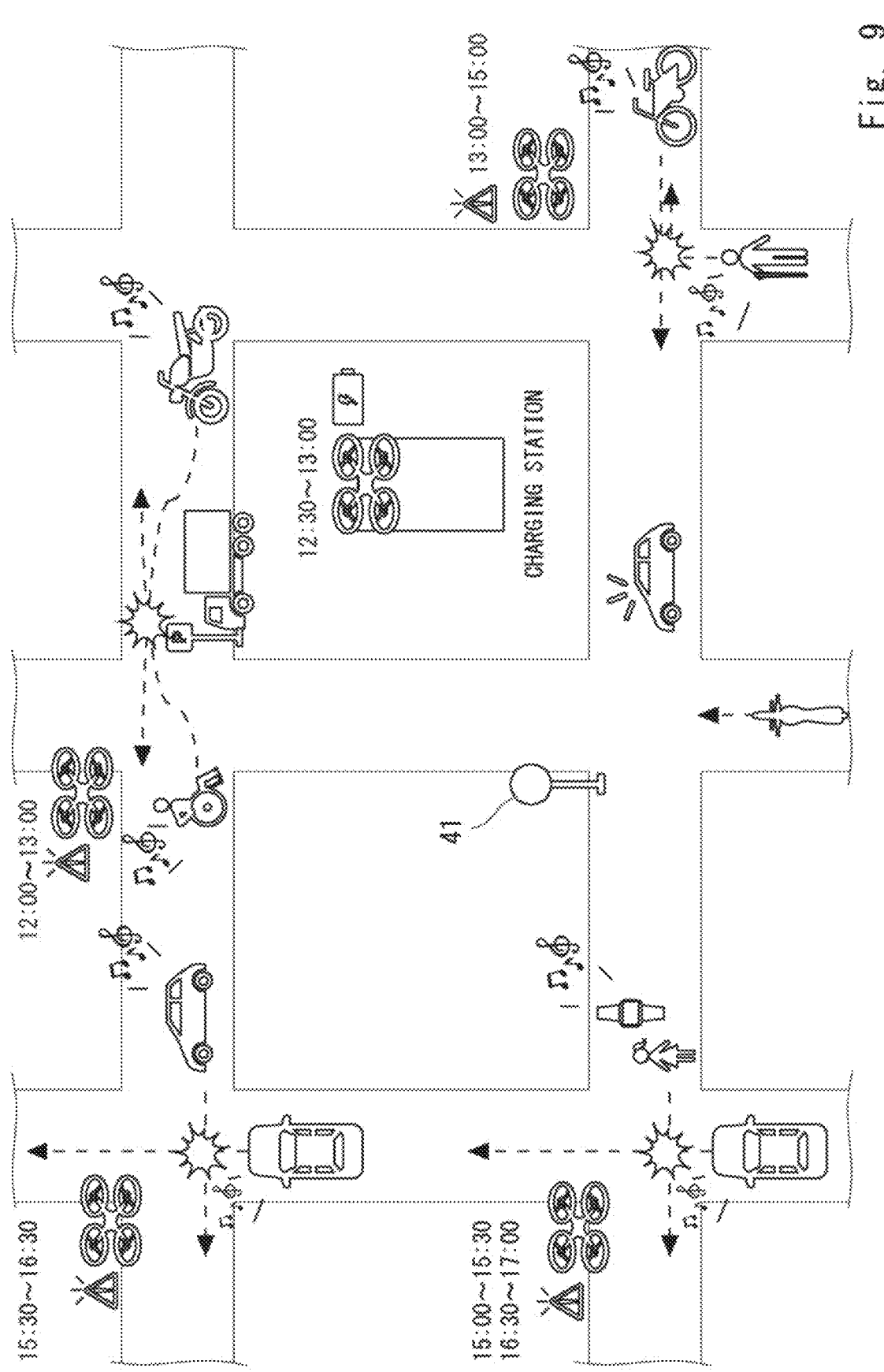
FIG. 9 is a diagram schematically illustrating an example of the process by the monitoring system according to the second example embodiment.

Next, an example of another process by the monitoring system 1 will be described with reference to FIGS. 7 to 9. FIG. 7 is a flowchart illustrating an example of the process by the monitoring system 1. FIG. 8 is a plan view illustrating a road including a plurality of intersections and is a diagram schematically illustrating an example of the process by the monitoring system 1. FIG. 9 is a plan view illustrating a road including a plurality of intersections and is a diagram schematically illustrating an example of the process by the monitoring system 1. Here, the plurality of intersections indicate an example of a plurality of regions in which a dangerous event is likely to occur on the road. Further, in FIGS. 8 and 9, an example of the time of patrol of each monitoring region by the moving body 11 is illustrated by the notation of time. Further, FIGS. 8 and 9 illustrate an aspect in which a pedestrian and a vehicle, or vehicles approach each other in each monitoring region as an example of the situation that can lead to an accident.

First, in step S301, the monitoring region control unit 13 acquires information of the region monitored by the moving body 11 and the monitoring time with reference to the information of the map information acquisition unit 15. Then, in step S302, the monitoring region control unit 13 moves the moving body 11 to the determined monitoring position. Then, in step S303, the moving body 11 starts monitoring the monitoring region. Then, in step S304, in a case where a dangerous event is detected by the moving body 11 (Yes in step S304), the process proceeds to step S305. On the other hand, in a case where a dangerous event is not detected by the moving body 11 (No in step S304), the process proceeds to step S306.

In step S305, the broadcast unit 24 broadcasts that the dangerous event has been detected to the passer. Specifically, as illustrated in FIGS. 8 and 9, the broadcast unit 24 communicates with the communication terminal possessed by the pedestrian and the in-vehicle terminal of the vehicle and causes the communication terminal and the in-vehicle terminal to issue an alert. Therefore, the pedestrian and the vehicle are notified that they may have an accident or are in a situation that can lead to an accident. Then, the process proceeds to step S309.

In step S306, the report unit 14 is prompted to report the dangerous event, and the report acquisition unit 12 acquires the report on the dangerous event. Specifically, the report acquisition unit 12 communicates with the communication terminal possessed by the pedestrian and the in-vehicle terminal of the vehicle to acquire the report on the details of the dangerous event such as the occurrence time, the position, and the situation. Then, in step S307, the report acquisition unit 12 feeds back the acquired information of the details of the dangerous event to the map information acquisition unit 15. The map information acquisition unit 15 updates the information of the monitoring region by the moving body 11 and the monitoring time on the basis of the fed-back information. Then, in step S308, the monitoring region control unit 13 changes the monitoring position by the moving body 11 on the basis of the updated information of the map information acquisition unit 15.

In addition, in a case where a dangerous event is not detected by the moving body 11 (No in step S304) and the report acquisition unit 12 does not acquire the report on the dangerous event, information indicating that no dangerous event has occurred may be fed back to the map information acquisition unit 15, which is not illustrated. For example, the map information acquisition unit 15 may perform a process of lowering a monitoring priority of the monitoring region and changing the monitoring time by the moving body 11.

Then, in step S309, it is determined whether to end the monitoring time in the monitoring region by the moving body 11. In a case where the monitoring time in the monitoring region is ended (Yes in step S309), the process proceeds to step S310. In a case where the monitoring time is not ended (No in step S309), the process returns to step S304, and the detection of the dangerous event by the moving body 11 in the monitoring region is continued.

Then, in step S310, it is determined whether the operating time of the moving body 11 has ended. Whether to end the operating time of the moving body 11 is determined according to, for example, a reduction in the remaining battery level of the moving body 11 or the presence or absence of the monitoring region to be monitored at the time of the determination. When determining that the operating time of the moving body 11 has ended (Yes in step S310), the monitoring system 1 ends the process. When determining that the operating time of the moving body 11 has not ended (No in step S310), the monitoring system 1 returns the process to step S302 and moves the moving body 11 to the monitoring region. Here, the monitoring region of the moving body 11 is determined again on the basis of the information of the map information acquisition unit 15. For example, as illustrated in FIGS. 8 and 9, in a case where the monitoring region to be monitored has been changed at the time of the determination, the monitoring region control unit 13 moves the moving body 11 to another monitoring region. On the other hand, in a case where the monitoring region to be monitored is the currently disposed monitoring region at the time of the determination, the monitoring region control unit 13 keeps the moving body 11 in the monitoring region.

A specific example of the flow of the process in steps S301 to S310 will be described with reference to FIGS. 8 and 9. As indicated by the notation of time in FIGS. 8 and 9, the moving body 11 is assigned the region to be monitored on the road every predetermined hour. For example, assignment information is set in advance in the map information acquisition unit 15. The monitoring region control unit 13 causes the moving body 11 to patrol each region according to the time.

As an example, as illustrated in FIG. 8, first, the monitoring region control unit 13 moves the moving body 11 to one monitoring region desired to be monitored during 12:00 to 13:00 on the basis of the information stored in the map information acquisition unit 15. Then, the monitoring system 1 executes the process in steps S303 to S309 in the monitoring region. That is, the monitoring system 1 executes a process of immediately notifying the passer of the detected dangerous event while appropriately determining whether to change the monitoring region of the moving body 11 in a region in the vicinity of the selected one monitoring region. When the monitoring time in the monitoring region ends, the monitoring region control unit 13 moves the moving body 11 to execute monitoring in another monitoring region desired to be monitored during 13:00 to 14:00. The monitoring system 1 repeats this process to execute the monitoring by the moving body 11 in each monitoring region until the operating time ends.

In addition, in a case where it is determined that it is sufficient to provide a fixed broadcast means in the monitoring region on the basis of the detection result by the moving body 11 and the report acquired by the report acquisition unit 12, a fixed broadcast means 41 may be installed in the monitoring region or in the vicinity of the monitoring region as represented by a two-dot chain line in FIG. 8. The fixed broadcast means 41 may be configured to immediately notify the passer of the dangerous event. For example, the fixed broadcast means 41 is a mirror. Furthermore, the fixed broadcast means 41 may be, for example, a monitoring camera including a broadcast unit like the monitoring apparatus 16. In a case where the fixed broadcast means 41 is installed, a process may be performed that sets information of a region, of which the monitoring by the fixed broadcast means 41 can be omitted, in the map information acquisition unit 15 and excludes the region in which the fixed broadcast means 41 is installed from the monitoring region by the moving body 11. Alternatively, in the region, the monitoring of a range that is not capable of being broadcasted by the fixed broadcast means 41 is complemented by the moving body 11.

As illustrated in FIG. 9, the actual provision of the fixed broadcast means 41 makes it possible to appropriate the time, during which the moving body 11 performs monitoring in the monitoring region, for monitoring in another monitoring region. In addition, a battery station that charges the battery of the moving body 11 may be included as one of the regions patrolled by the moving body 11. The above-described monitoring plan of the moving body 11 is appropriately updated on the basis of the detection result of the dangerous event by the moving body 11 and the report acquired by the report acquisition unit 12.

According to the monitoring system 1, it is possible to determine whether to change the monitoring region of the moving body 11 such that the monitoring region by the moving body 11 is a region in which the dangerous event is easily detected, on the basis of the report acquired by the report acquisition unit 12 in the monitoring region set on the road. That is, the monitoring system 1 can optimize the monitoring region by the moving body 11.

Here, the report acquisition unit 12 acquires the report on the dangerous event from the passer passing through the monitoring region or the vicinity of the monitoring region. Therefore, the monitoring system 1 can determine whether to change the monitoring region of the moving body 11 on the basis of the information of the dangerous event that has actually occurred on the road.

In addition, the monitoring system 1 determines whether to change the monitoring region by the moving body 11 on the basis of the comparison between the dangerous event detected by the moving body 11 and the dangerous event specified by the report acquired by the report acquisition unit 12. Therefore, for example, in a case where the moving body 11 detects a specific dangerous event and the report acquisition unit 12 acquires a report on another dangerous event, the monitoring system 1 can weight which dangerous event should be preferentially detected. The monitoring system 1 can determine whether to change the monitoring region by the moving body 11 such that a dangerous event having a high detection priority can be detected.

In addition, for example, the monitoring system 1 can acquire the report with the report acquisition unit 12 and change the monitoring region by the moving body 11 so as to include a position where the dangerous event specified by the report can be detected. As a specific example, in a case where a dangerous event occurs in a blind spot of the monitoring region by the moving body 11, a situation may occur in which the dangerous event has not been detected by the moving body 11, but the report on the dangerous event has been acquired by the report acquisition unit 12. In this case, according to the monitoring system 1, the monitoring region by the moving body 11 can be changed to detect the dangerous event that has not been detected in the monitoring region by the moving body 11 before the change.

In addition, the monitoring system 1 acquires the report with the report acquisition unit 12 and determines not to change the monitoring region in a case where the dangerous event specified by the report is detected by the moving body 11. That is, in a case where the monitoring system 1 detects the dangerous event in the monitoring region and also acquires the report on the dangerous event, the monitoring system 1 can determine the monitoring region of the moving body 11 as a region requiring continuous monitoring in the current monitoring region.

In addition, the monitoring system 1 divides the monitoring region by the moving body 11 and a peripheral region of the monitoring region into a plurality of virtual areas and determines which area is included in the monitoring region by the moving body 11. Specifically, when the moving body 11 is disposed in any area, the dangerous event is not detected by the moving body 11, and the report on the dangerous event is acquired by the report acquisition unit 12, the area in which the moving body 11 is disposed is changed such that an area, which is adjacent to the area, in the peripheral region is also included in the monitoring region. According to the monitoring system 1, when the monitoring region by the moving body 11 is optimized, it is possible to simplify the process of determining the monitoring region of the moving body 11.

In addition, in a case where the monitoring system 1 includes the monitoring apparatus 16 fixedly installed on the road or in the vicinity of the road, the monitoring region by the moving body 11 is set on the basis of the monitoring range by the monitoring apparatus 16. Therefore, the monitoring system 1 can detect the dangerous event more reliably, using both the monitoring by the moving body 11 and the monitoring by the monitoring apparatus 16.

In addition, the monitoring system 1 acquires information of the region in which the dangerous event is likely to occur on the road and the time when the dangerous event is likely to occur using the map information acquisition unit 15. The monitoring system 1 determines which region on the road is to be the monitoring region by the moving body 11 on the basis of the information acquired by the map information acquisition unit 15. Therefore, the monitoring system 1 can specify the region desired to be monitored on the road every hour and cause the moving body 11 to patrol each region.

In addition, the monitoring system 1 updates the information stored in the map information acquisition unit 15 on the basis of the detection result of the dangerous event by the moving body 11 and the report acquired by the report acquisition unit 12. The monitoring system 1 can determine monitoring priorities for each region on the road according to circumstances such as the frequency of detection of the dangerous event and a specific situation of the reported dangerous event. Therefore, the monitoring system 1 can cause the moving body 11 to suitably patrol the region desired to be monitored on the road.

In addition, the monitoring system 1 further acquires the remaining battery level for driving the moving body 11 in the map information acquisition unit 15 and creates the monitoring plan by the moving body 11 on the basis of the remaining battery level of the moving body 11 in addition to the information of the region in which the dangerous event is likely to occur and the time when the dangerous event is likely to occur. Therefore, the monitoring system 1 can configure a patrol route of the moving body 11 in consideration of the operating time of the moving body 11. Further, in a case where the monitoring regions of a plurality of moving bodies 11 are set, the monitoring system 1 can allocate the disposition of the moving body to each region on the road in consideration of the operating time of each moving body 11.

In addition, when detecting the dangerous event using the moving body 11, the monitoring system 1 broadcasts the dangerous event to the passer using the broadcast unit 24. Therefore, the monitoring system 1 can immediately notify the passer of an accident or a situation that can lead to an accident to call attention to the passer. Here, the monitoring system 1 can optimize the monitoring region of the moving body 11 to reduce a situation in which the occurrence position of the dangerous event is a blind spot of the monitoring region by the moving body 11, which makes it possible to more reliably broadcast the dangerous event to the passer.

In addition, the present disclosure is not limited to the above-described example embodiments and can be appropriately changed without departing from the scope of the present disclosure. For example, in the above-described example, an example has been described in which the moving body 11 is disposed at the intersection. However, this is described as an example of the point where the dangerous event is likely to occur. That is, the monitoring region by the moving body 11 can be appropriately set to any region desired to be monitored.

In addition, an example has been described in which the disposition of the moving body 11 is changed as a means for changing the monitoring region by the moving body 11. However, the present disclosure is not limited thereto. As the means for changing the monitoring region, other means can be adopted as long as the means can move the monitoring region to a predetermined position. For example, the disposition of the moving body 11 may be kept on the spot, and the angle of view of the imaging unit 22 mounted on the moving body 11 may be changed to change the monitoring region.

In addition, for the creation of the area in which the moving body 11 is disposed, an example has been described in which the imaging unit 22 and the image processing unit 23 divide one point on the road into a plurality of virtual areas to obtain the monitoring area 23a. However, the present disclosure is not limited thereto. For example, information for dividing a specific region on the road into a plurality of virtual areas may be set in the map information acquisition unit 15 in advance. Further, the information for division into a plurality of virtual areas may be determined for each of a plurality of regions desired to be monitored on the road and may be set in the map information acquisition unit 15 in advance.

Furthermore, in the above-described example embodiments, an example has been described in which the monitoring region is imaged by the imaging unit 22 mounted on the moving body 11 as the means for monitoring by the moving body 11. However, the present disclosure is not limited thereto. As the means for monitoring by the moving body 11, other configurations can be applied as long as the configurations can detect the dangerous event in the monitoring region set on the road. For example, the means for monitoring by the moving body 11 may be a sensor that detects a sound of the pedestrian or the vehicle approaching.

In addition, the report acquisition unit 12 may request the passer to report the dangerous event even in a case where the dangerous event is detected by the moving body 11 and broadcasted by the broadcast unit 24. In this case, the information stored in the map information acquisition unit 15 can be updated on the basis of both the detection result of the dangerous event by the moving body 11 and the report by the passer to set the monitoring region by the moving body 11 to a more suitable region. Further, the report acquisition unit 12 may be configured to receive the report from an autonomous vehicle that has encountered the dangerous event. That is, the passer that sends the report to the report acquisition unit 12 includes an autonomous driving apparatus without a person on board, and the report acquired by the report acquisition unit 12 also includes a report automatically created by the autonomous driving apparatus.

In addition, an example has been described in which, as a means for broadcasting the dangerous event to the passer, the broadcast unit 24 provided in the moving body 11 communicates with the communication terminal 31 possessed by the passer and the communication terminal 31 issues an alert. However, the present disclosure is not limited thereto. The configuration of the broadcast unit 24 can be appropriately changed as long as the broadcast unit 24 can immediately broadcast the dangerous event to the passer. For example, a means for issuing an alert may be further mounted on the moving body 11. Alternatively, a configuration may be adopted in which an alarm that issues an alert when the dangerous event is detected by the moving body 11 is installed on the road.

Further, in the above-described example embodiments, an example has been described in which the monitoring system 1 causes one moving body 11 to patrol each region on the road. However, the monitoring system 1 may be configured to collectively manage the movement of a plurality of moving bodies 11. That is, in the monitoring system 1, the moving body 11 may be disposed in one region on the road and another moving body 11 may be disposed in another region such that the moving bodies 11 simultaneously perform monitoring in a plurality of regions on the road. In this case, the map information acquisition unit 15 may set the patrol route of each moving body 11 according to the disposition of each moving body 11 and the remaining battery level of each moving body 11. For example, one route of patrolling a plurality of regions on the road may be configured, and the moving bodies 11 may patrol in order along a similar route. Alternatively, the moving body 11 with the lowest remaining battery level may be disposed in a region desired to be monitored in a short time with reference to the remaining battery level of each moving body 11. Alternatively, the moving body 11 with the lowest remaining battery level may be preferentially disposed in a region near the charging station. The monitoring system 1 can suitably control the disposition of a plurality of moving bodies 11 in a plurality of regions on the road.

In addition, an example has been described in which the moving body 11 is a drone that moves in the air. However, the moving body 11 is not limited to the drone. The moving body 11 may be any object as long as it can be controlled by the monitoring region control unit 13, can autonomously move on the road, and can monitor a predetermined monitoring region. For example, the moving body 11 may be a robot that moves on a road surface. Furthermore, as another example, the moving body 11 may be an autonomous vehicle.

Each configuration in the above-described example embodiments may be implemented by hardware, software, or both the hardware and software, may be implemented by one hardware or software component, or may be implemented by a plurality of hardware or software components. The functions (processes) of each apparatus may be implemented by a computer having a central processing unit (CPU), a memory, and the like. For example, a program for executing a method (for example, a control method) according to the example embodiment may be stored in the storage device, and the CPU may execute the program stored in the storage device to implement each function.

These programs can be stored using various types of non-transitory computer readable media and supplied to the computer. The non-transitory computer readable media include various types of tangible storage media. Examples of the non-transitory computer readable medium include magnetic recording media (for example, a flexible disk, a magnetic tape, and a hard disk drive), a magneto-optical recording medium (for example, a magneto-optical disk), a CD-read only memory (ROM), a CD-R, a CD-R/W, and semiconductor memories (for example, a mask ROM, a programmable ROM (PROM), an erasable PROM (EPROM), a flash ROM, and a random access memory (RAM)). In addition, the programs may be supplied to the computer by various types of transitory computer readable media. Examples of the transitory computer readable medium include electrical signals, optical signals, and electromagnetic waves. The transitory computer readable medium can supply the program to the computer via a wired communication path, such as an electric wire or an optical fiber, or a wireless communication path.

Some or all of the above-described example embodiments may be described as in the following Supplementary Notes, but are not limited to the following Supplementary Notes.
(Supplementary Note 1)

A monitoring system that monitors a monitoring region set on a road using a moving body, the monitoring system including:
  a report acquisition unit configured to acquire a report on a dangerous event in the monitoring region or in a vicinity of the monitoring region; and
  a monitoring region control unit configured to determine whether to change the monitoring region on the basis of the report acquired by the report acquisition unit.
(Supplementary Note 2)

The monitoring system according to Supplementary Note 1, wherein the report acquisition unit acquires the report from a passer that passes through the monitoring region or a vicinity of the monitoring region.

(Supplementary Note 3)

The monitoring system according to Supplementary Note 1 or 2, wherein the monitoring region control unit determines whether to change the monitoring region on the basis of a comparison between a dangerous event detected by the moving body and a dangerous event specified by the report.
(Supplementary Note 4)

The monitoring system according to any one of Supplementary Notes 1 to 3, wherein the monitoring region control unit changes the monitoring region so as to include a position where the dangerous event specified by the report is capable of being detected.
(Supplementary Note 5)

The monitoring system according to any one of Supplementary Notes 1 to 4, wherein the monitoring region control unit determines not to change the monitoring region in a case where the dangerous event specified by the report is detected by the moving body.
(Supplementary Note 6)

The monitoring system according to Supplementary Note 4, wherein, in a case where the dangerous event is not detected by the moving body in any one of a plurality of areas obtained by virtually dividing the monitoring region and a peripheral region of the monitoring region and the report on the dangerous event is acquired by the report acquisition unit, the monitoring region control unit changes the monitoring region such that an area, which is adjacent to the area, in the peripheral region is included in the monitoring region.
(Supplementary Note 7)

The monitoring system according to any one of Supplementary Notes 1 to 6, wherein the monitoring region control unit sets the monitoring region by the moving body on the basis of a monitoring region that is capable of being monitored by a monitoring apparatus fixedly installed on the road or in a vicinity of the road.
(Supplementary Note 8)

The monitoring system according to any one of Supplementary Notes 1 to 7, further including: a map information acquisition unit configured to acquire information of a region in which the dangerous event is likely to occur on the road and a time when the dangerous event is likely to occur,
  wherein the monitoring region control unit sets the monitoring region of the moving body on the basis of the information acquired by the map information acquisition unit.
(Supplementary Note 9)

The monitoring system according to Supplementary Note 8, wherein the map information acquisition unit updates the information of the region in which the dangerous event is likely to occur on the road and the time when the dangerous event is likely to occur, on the basis of a detection result of the dangerous event by the moving body and the report acquired by the report acquisition unit.
(Supplementary Note 10)

The monitoring system according to Supplementary Note 8 or 9, wherein
  the map information acquisition unit further acquires a remaining battery level for driving the moving body and creates a monitoring plan by the moving body on the basis of information of a point where the dangerous event is likely to occur and the time when the dangerous event is likely to occur and the remaining battery level, and
  the monitoring region control unit causes the moving body to patrol a plurality of monitoring regions on the road on the basis of the monitoring plan.

(Supplementary Note 11)

The monitoring system according to any one of Supplementary Notes 1 to 10, further including: a broadcast unit configured to, when the dangerous event is detected by the moving body, broadcast the dangerous event to a vehicle or a person that passes through the monitoring region or the vicinity of the monitoring region.

(Supplementary Note 12)

A monitoring method for monitoring a monitoring region set on a road using a moving body, the monitoring method including:

a step of acquiring a report on a dangerous event in the monitoring region or in a vicinity of the monitoring region; and a step of determining whether to change the monitoring region on the basis of the acquired report.

(Supplementary Note 13)

A non-transitory computer readable medium storing a monitoring program for monitoring a monitoring region set on a road using a moving body, the monitoring program causing a computer to execute:

a step of acquiring a report on a dangerous event in the monitoring region or in a vicinity of the monitoring region; and a step of determining whether to change the monitoring region on the basis of the acquired report.

REFERENCE SIGNS LIST

1 MONITORING SYSTEM
11 MOVING BODY
12 REPORT ACQUISITION UNIT
13 MONITORING REGION CONTROL UNIT
14 REPORT UNIT
15 MAP INFORMATION ACQUISITION UNIT
16 MONITORING APPARATUS
21 MONITORING UNIT
22 IMAGING UNIT
23 IMAGE PROCESSING UNIT
24 BROADCAST UNIT
31 COMMUNICATION TERMINAL
41 FIXED BROADCAST MEANS
101 PEDESTRIAN
102 VEHICLE

What is claimed is:

1. A monitoring system for monitoring a monitoring region set on a road using a moving body, the monitoring system comprising:

at least one memory storing instructions; and at least one processor configured to execute the instructions to:

detect, based on an image of the monitoring region and a peripheral region of the monitoring region captured by the moving body from the sky, a dangerous event indicating approach between passers that pass through the monitoring region or a vicinity of the monitoring region;

request, when the dangerous event is detected, a communication terminal possessed by a passer, of the passers, to send a report of the dangerous event by communicating with the communication terminal;

acquire the report from the communication terminal;

determine a position of the moving body on the basis of the acquired report; and move the moving body to the determined position by communicating with the moving body.

2. The monitoring system according to claim 1, wherein the at least one processor is further configured to execute the instructions to determine whether to change the monitoring region on the basis of a comparison between a dangerous event detected by the moving body and a dangerous event specified by the report.

3. The monitoring system according to claim 1, wherein the at least one processor is further configured to execute the instructions to change the monitoring region so as to include a position where the dangerous event specified by the report is capable of being detected.

4. The monitoring system according to claim 1, wherein the at least one processor is further configured to execute the instructions to determine not to change the monitoring region in a case where the dangerous event specified by the report is detected by the moving body.

5. The monitoring system according to claim 3, wherein the at least one processor is further configured to execute the instructions to, in a case where the dangerous event is not detected by the moving body in any one of a plurality of areas obtained by virtually dividing the monitoring region and a peripheral region of the monitoring region and the report on the dangerous event is acquired change the monitoring region such that an area, which is adjacent to the area, in the peripheral region is included in the monitoring region.

6. The monitoring system according to claim 1, wherein the at least one processor is further configured to execute the instructions to set the monitoring region by the moving body on the basis of a monitoring region that is capable of being monitored by a monitoring apparatus fixedly installed on the road or in a vicinity of the road.

7. The monitoring system according to claim 1, wherein the at least one processor is further configured to execute the instructions to:

acquire information of a region in which the dangerous event is likely to occur on the road and a time when the dangerous event is likely to occur; and set the monitoring region of the moving body on the basis of the acquired information.

8. The monitoring system according to claim 7, wherein the at least one processor is further configured to execute the instructions to update the information of the region in which the dangerous event is likely to occur on the road and the time when the dangerous event is likely to occur, on the basis of a detection result of the dangerous event by the moving body and the acquired report.

9. The monitoring system according to claim 7, wherein the at least one processor is further configured to execute the instructions to:

acquire a remaining battery level for driving the moving body and create a monitoring plan by the moving body on the basis of information of a point where the dangerous event is likely to occur and the time when the dangerous event is likely to occur and the remaining battery level; and cause the moving body to patrol a plurality of monitoring regions on the road on the basis of the monitoring plan.

10. The monitoring system according to claim 1, wherein the at least one processor is further configured to execute the instructions to, when the dangerous event is detected by the moving body, broadcast the dangerous event to a vehicle or a person that passes through the monitoring region or the vicinity of the monitoring region.

11. A monitoring method for monitoring a monitoring region set on a road using a moving body, the monitoring method comprising:

a step of detecting, based on an image of the monitoring region and a peripheral region of the monitoring region captured by the moving body from the sky, a dangerous event indicating approach between passers that pass through the monitoring region or a vicinity of the monitoring region;

a step of requesting, when the dangerous event is detected, a communication terminal possessed by a passer, of the passers, to send a report of the dangerous event by communicating with the communication terminal;

a step of acquiring the report from the communication terminal;

a step of determining a position of the moving body on the basis of the acquired report; and a step of moving the moving body to the determined position by communicating with the moving body.

12. A non-transitory computer readable medium storing a monitoring program for monitoring a monitoring region set on a road using a moving body, the monitoring program causing a computer to execute:

a step of detecting, based on an image of the monitoring region and a peripheral region of the monitoring region captured by the moving body from the sky, a dangerous event indicating approach between passers that pass through the monitoring region or a vicinity of the monitoring region;

a step of requesting, when the dangerous event is detected, a communication terminal possessed by a passer, of the passers, to send a report of the dangerous event by communicating with the communication terminal;

a step of acquiring the report from the communication terminal;

a step of determining a position of the moving body on the basis of the acquired report; and a step of moving the moving body to the determined position by communicating with the moving body.

* * * * *